July 15, 1969  J. W. E. HANES  3,455,578
FLUID PRESSURE RELEASABLE AUTOMATIC TOOL JOINT
Filed Jan. 3, 1967  3 Sheets-Sheet 1
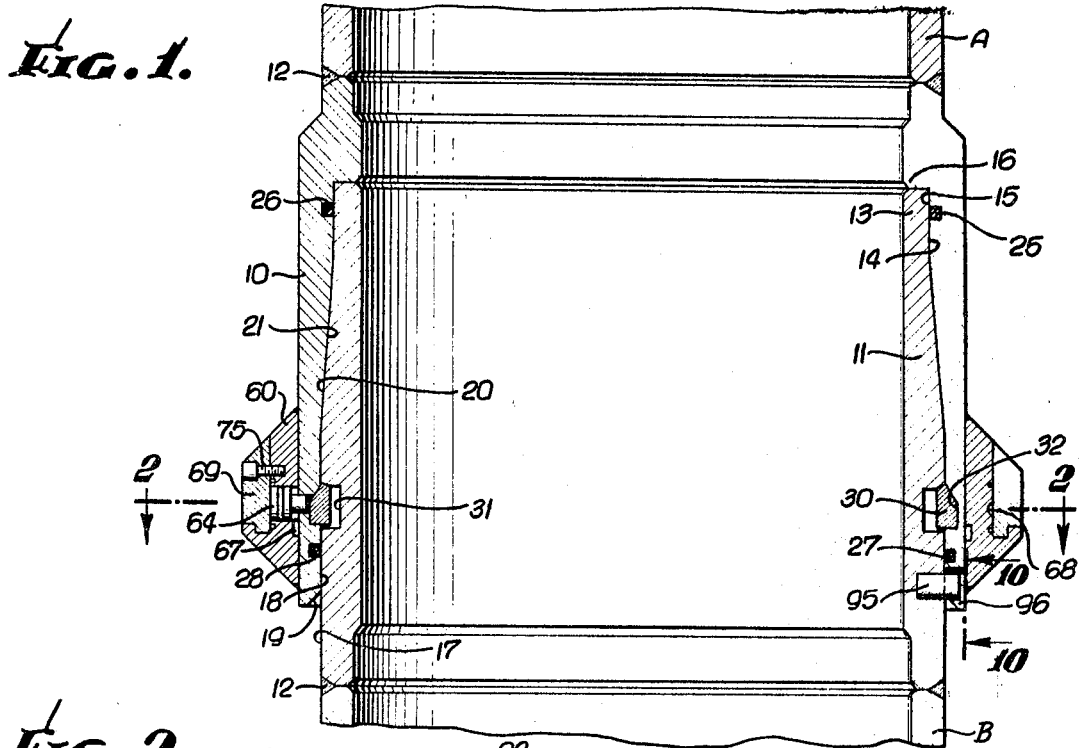
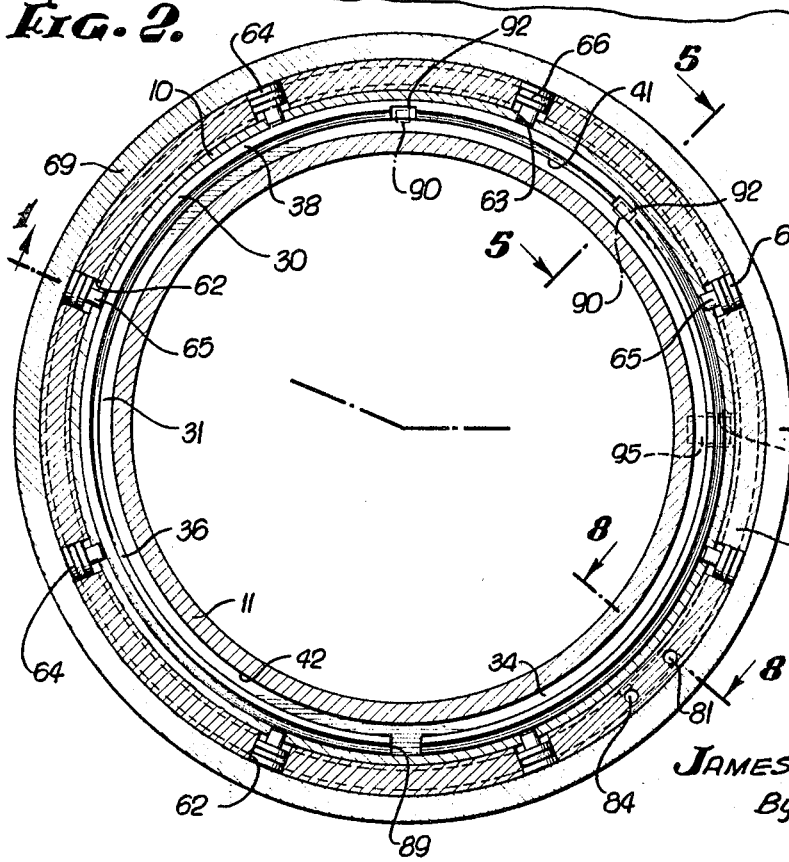
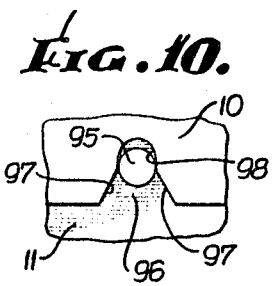
INVENTOR.
JAMES W. E. HANES
BY Bernard Kriegel
ATTORNEY.

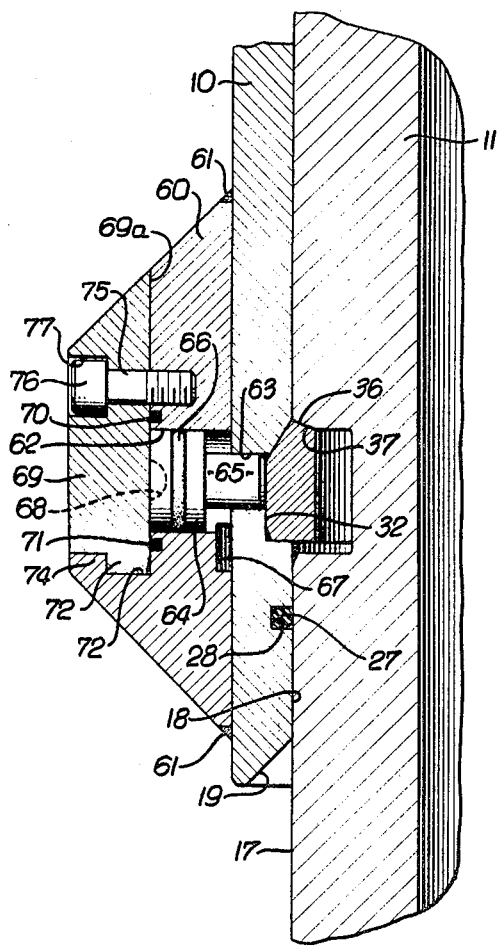

July 15, 1969    J. W. E. HANES    3,455,578
FLUID PRESSURE RELEASABLE AUTOMATIC TOOL JOINT
Filed Jan. 3, 1967    3 Sheets-Sheet 3

INVENTOR.
JAMES W. E. HANES
By Bernard Kriegel
ATTORNEY.

United States Patent Office 3,455,578
Patented July 15, 1969

3,455,578
FLUID PRESSURE RELEASABLE AUTOMATIC TOOL JOINT
James W. E. Hanes, Ventura, Calif., assignor to Ventura Tool Company, Ventura, Calif., a corporation of California
Filed Jan. 3, 1967, Ser. No. 606,827
Int. Cl. F16l *21/00, 35/00, 55/00*
U.S. Cl. 285—18     7 Claims

ABSTRACT OF THE DISCLOSURE

A tool joint in which a pin member is locked within a box member by a resilient split lock ring disposed in confronting grooves in both members. The box member has a plurality of radial cylinders containing pistons bearing against the lock ring to contract the latter from the box member groove to disconnect the pin member and box member from each other. An orienting device retains the split of the lock ring out of alignment with the pistons.

---

The present invention relates to tool joints for connecting adjacent pipe sections, or the like, to one another through use of an intervening lock ring, in which the pipe sections can be readily released from one another from a remote location by the application of fluid pressure through a suitable conduit to effect retraction of the lock ring from one of the tool joint members. Additionally, tension applied to the string of pipe tends to hold the lock ring in its locking position, preventing its inadvertent release.

In connection with drilling of wells from a floating barge or other vessel, or a platform, large diameter conductors or casings are used which may be driven into the formation or run into a previously drilled hole. The present practice is to weld the large diameter conductor sections to one another as they are being lowered into place from the deck of the drilling vessel or platform. When the appropriate length of conductor has been driven or lowered into the hole, the conductor is cemented into the formation to the mudline or the floor of the ocean. When he well is completed, or abandoned, it is necessary to cut off the conductor at or near the mudline, which, heretofore, has required the lowering of a diver to the desired depth with suitable equipment, such as a cutting torch, for making the cut. Another method for effecting and disconnection involves the use of a so-called "shear joint" which embodies a series of pins that are to fail and shear under a predetermined load. Variables enter into this system since to pins may shear prematurely and induce costly repairs or abandonment of the hole or well bore.

It has also been proposed to use laterally shiftable lock rings for coupling adjacent pipe sections to one another. The tensile load of the conductor or casing string is transmitted through the lock ring. There may be a tendency for the lock ring to be shifted by the tensile load to an unlocked or released condition, which is highly undesirable.

In the present invention a tool joint is provided for connecting adjacent pipe sections to one another through use of a laterally shiftable lock device, such as a split lock ring, in which release of the lock ring from its coupling position is effected by fluid pressure applied to the tool joint from a remote location, thereby obviating the need for cutting off the conductor at or near the mudline by a diver or welder. More specifically, the required fluid or hydraulic pressure can be applied through a conduit from the drilling vessel or platform to effect the disconnection.

Another object of the invention is to provide a tool joint, in which the lock ring, or corresponding lock device, for interconnecting the pin and box members of the joint is retractable from one of such members to disconnect the tool joint members from one another by a hydraulic device, the tool joint members and the lock ring being so related to one another as to appropriately orient the lock ring relative to the fluid operated mechanism, in order to prevent such mechanism from engaging in the split or gap of the lock ring.

A further object of the invention is to provide a tool joint embodying a lock ring for interconnecting the pin and box members of the joint, in which the tensile force transmitted through the joint and the lock ring do not tend to inadvertently release the lock ring from one of the tool joint members. In fact, the parts are so shaped and related to one another as to cause the tensile force transmitted between the pin and box members of the tool joint to tend to retain the lock ring in its locked condition.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a longitudinal section through a tool joint, and associated pipe sections, embodying the invention in assembled condition, taken along the line 1—1 on FIG. 2;

FIG. 2 is a cross-section taken along the line 2—2 on FIG. 1;

FIG. 3 is an enlarged fragmentary longitudinal section through the locking portion of the tool joint disclosed in FIG. 1;

FIG. 4 is a view corresponding to FIG. 3 showing the lock ring released from the groove of the box member of the tool joint;

FIG. 5 is an enlarged cross-section taken along the line 5—5 on FIG. 2;

FIG. 6 is a vertical section taken along the line 6—6 on FIG. 5;

FIG. 10 is a view taken along the line 10—10 on FIG. 1.

Figure 8:
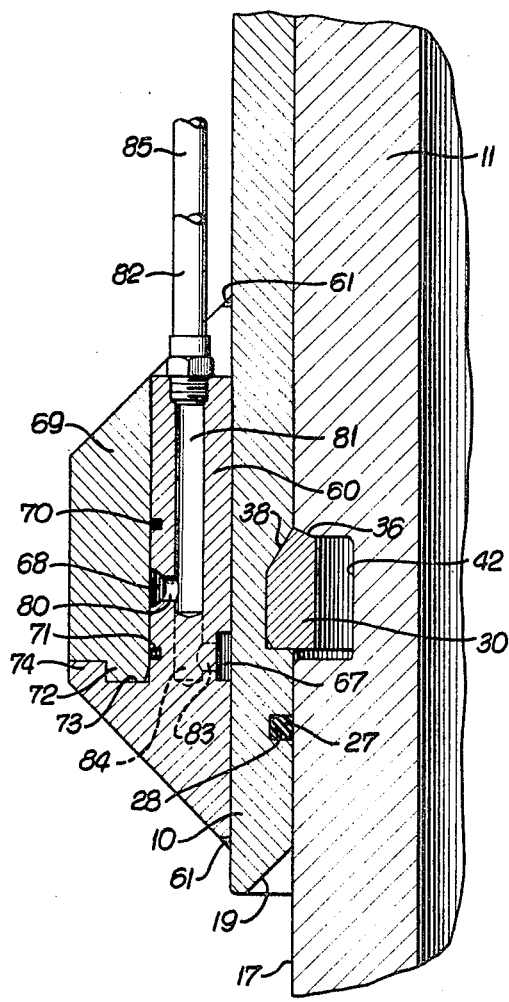
FIG. 8 is an enlarged vertical section taken along the line 8—8 on FIG. 2.

As disclosed in the drawings, it is desired to connect or couple the lower end of one pipe section A to the upper end of an adjacent pipe section B. A specific use of the invention is in effecting coupling between sections of marine conductor pipe or casing, in which the conductor pipe is to be lowered from a floating vesel or a platform (not shown) through a body of water for the purpose of being driven into the floor of the ocean or into an existing well bore (not shown). Each pipe section has a lower box portion or member 10 and an upper pin portion or member 11. The lower box portion of one pipe section A is adapted to be disposed over the upper pin portion of a pipe section B therebelow, the pin and box portions or members collectively constituting a tool joint or connector for coupling adjacent pipe sections A, B to one another. The lower box portion 10 has its upper end suitably secured to the pipe or tubular member A thereabove, as through use of welding material 12. Similarly, the lower end of the upper pin member of the tool joint is connected, as by welding material 12, to the pipe section B therebelow of which it actually forms a part.

The upper portion 13 of the pin member 11 has an outer cylindrical surface 14 adapted to fit snugly within an inner cylindrical wall 15 at the upper portion of the box member 10, this cylindrical surface 15 terminating at an upper box shoulder 16. Similarly, the pin member has a lower outer cylindrical surface 17, of a substantially greater diameter than its upper cylindrical surface 14, adapted to fit within a companion inner cylindrical wall 18 at the lower entry portion of the box member 10, the lower end of the cylindrical surface 18 merging into an outwardly flaring mouth portion 19 constituting the terminus of the box member. The pin 11 has an intermediate outer tapered wall or section 20 extending from the upper end of its lower cylindrical surface 17 to the lower end of its upper cylindrical surface 14. This tapering wall 20 is adapted to fit within and is companion to an inner tapered wall 21 in the box member which tapers in an upward direction from the upper end of the lower inner cylindrical surface 18 to a lower end of the upper cylindrical surface 15. The distance between the lower end of the upper outer cylindrical surface 14 of the pin and the upper end of its lower outer surface 17 is substantially the same as the distance between the lower end of the inner cylindrical surface 15 and the upper end of its lower inner cylindrical surface 18, such that, when the pin is fully disposed within the box, and with the upper end of the pin abutting the box shoulder 16, the upper and lower outer cylindrical surfaces 14, 17 fit snugly within the upper and lower inner cylindrical surfaces 15, 18, respectively. The distance between the upper and lower cylindrical surfaces 14, 17 and 15, 18 is sufficient so that a stiff, stable structure is provided capable of resisting substantial bending loads.

When the pin 11 is inserted fully within the box 10, or the box is disposed fully over the pin, the upper outer cylindrical surface 14 of the pin member engages a primary elastic seal ring 25, such as a rubber or ruberlike O-ring, disposed in an internal groove 26 in the upper portion of the box, the lower outer cylindrical surface 17 engaging a secondary elastic seal ring 27, such as a rubber or rubber-like O-ring, disposed within an internal grove 28 in the lower portion of the box 10.

The pin member 11 and box member 10 are locked to one another by a split spring-like lock ring 30 that is inherently expandable and which is disposed within a peripheral groove 31 in the lower portion of the pin 11, this groove extending laterally inwardly from its lower cylindrical surface 17. The lock ring 30 can occupy a contracted position within the groove 31, such that its external diameter is less or no greater than the internal diameter of the lower inner cylindrical wall 18 of the box section 10, and it may be expanded outwardly into a companion and opposed internal grove 32 in the lower portion of the box member opening laterally through its lower cylindrical surface 18. This circumferential groove 32 has a lateral depth substantially less than the radial thickness of the lock ring 30, and may, in fact, have a lateral depth substantially half that of the lock ring so that when the lock ring is disposed fully within the internal groove, it is also contained substantially within the external groove 31 of the pin member 11.

As disclosed, the lock ring 30 has a lower surface 33 normal to the axis of the pin 11, which is slidable along the lower wall 34 of the external grove 31 in moving laterally therewithin, the upper end of the lock ring shifting along the upper wall 35 of this groove during contraction of the ring therewithin. As disclosed, the upper inner corner 36 of the lock ring is inclined or tapered in a downward and inward direction, and when expanded outwardly into the internal groove 32, such tapered or bevelled inner portion 36 is adapted to engage a companion tapered surface 37 inclined outwardly from the inner portion 35 of the groove wall in a direction away from the lower wall 34, the inner portion 35 also being normal to the axis of the pin member. The purposes of the tapered surfaces 36, 37 on the upper inner portion of the lock ring and the outer upper side of the pin groove are set forth hereinbelow.

The upper outer corner 38 of the lock ring 30 is bevelled to provide a cam surface tapering in an upward direction and meeting the upper end of the inner tapered lock ring surface 36. The cam surface 38 is adapted to engage a companion surface 39 constituting the upper side of the inner groove 32 of the box member. The lower side 40 of the box groove is normal to the axis of the box member, and when the pin is disposed fully within the box member, the lock ring 30 expands partially outwardly of the pin groove 31 and into the box groove 32 to lock or couple the pin and box to one another, with the upper and lower outer cylindrical surfaces 14, 17 of the pin member snugly disposed within the upper and lower inner cylindrical surfaces 15, 18 of the box member. With the lock ring 30 in its outwardly locked condition, the inner cylindrical surface 41 of the lock ring is spaced a substantial distance from the base 42 of the pin groove, the distance being sufficient to permit full retraction of the lock ring from the circumferential groove 32 of the box member 10.

In effecting a connection between the pin and box members 11, 10, the lock ring 30 is in its normal position partially within the pin member groove 31 and extending partially outwardly thereof. The box member 10 of the upper conductor casing section A is then slipped over the pin member 11, and when the outwardly flaring mouth portion 19 engages the upper outer tapered surface 38 of the lock ring, the latter is forced or retracted fully inwardly within its groove 31, allowing the box member 10 to slide therealong until the internal groove 32 is opposite the lock ring, whereupon the latter will inherently expand outwardly into the internal groove. At this time, the box member shoulder 16 engages the upper end of the pin member 11, with the primary and secondary seals 25, 27 in the box member sealingly engaging the upper and lower cylindrical surfaces 14, 17 of the pin member 11.

After the tool joint is made up by the coupling position of the lock ring 30 within the internal box member groove 32, the pipe sections A, B can be lowered, the weight of lower pipe sections being exerted through the lock ring 30 of each joint onto the box member 10 of each pipe section thereabove. The weight of the pipe sections extending downwardly from a box member 10, which is actually a tensile load in the entire string of conductor pipe, is prevented from inadvertently retracting the lock ring 30 from its companion internal groove 32, which would effect an undesired uncoupling of the pin member 11 from the box member 10. In fact, the tensile load of the conductor pipe being transmitted through the lock ring between the pin and box members is caused to actually urge and retain the lock ring 30 in its outward expanded condition snugly engaged within the internal groove 32 of the box member 10.

Figure 9:
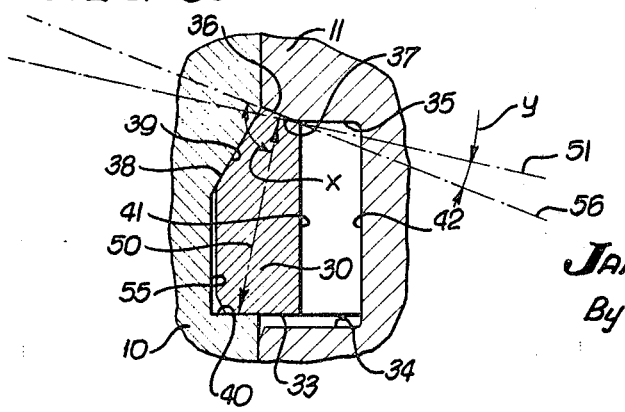
FIG. 9 is a diagrammatic view illustrating the transmission of forces between the pin and box members and through the lock ring of the tool joint.

By referring more particularly to FIG. 9, it will be noted that the tensile load referred to above transmits a compressive force 50 through the lock ring 30, this compressive force extending from the lower side 40 of the box member groove, through the lock ring to the upper side 37 of the pin member groove. If it is assumed that the upper side 36 of the lock ring and the outer portion 37 of the upper side of the pin member groove were normal to the axis of the pin and box members (a condition not illustrated), the line of compressive force 50 through the lock ring would be inclined in an upward and inward direction, as illustrated in FIG. 9, which would provide a thrust component tending to shift the lock ring 30 inwardly of the pin member groove 31, and, consequently, inwardly from the box member groove 32, or toward an unlocked or uncoupled condition. In addition, there would be a tilting tendency imposed upon the lock ring 30 that would cause its upper side to engage the corner of the pin member at the upper outer side of its groove, tending to cause its failure.

In the present case, the inward shifting tendency of the lock ring 30 is avoided by tapering or bevelling the upper inner corner 36 of the lock ring and the outer portion 37 of the upper side of the pin member groove 31. The angle that these inclined surfaces 36, 37 make is at least normal to the line of compressive force 50 being transmitted from the box member 10 through the lock ring 30 to the pin member 11, so that there is no lateral force component present tending to shift the lock ring in a lateral inward direction. Such tapered, normal surfaces, which are not disclosed in the drawings, are designated by the line 51 in FIG. 9 of the drawings, such line being normal or at right angles to the line of compressive force 50.

In the present case, the angle $x$ of the surfaces 36, 37 to the line of compressive force 50 transmitted through the lock ring is made greater than 90 degrees, which effectively transmits the compressive force between the inclined surfaces 36, 37 on the lock ring and the upper side of the pin member groove, but which also produces an outwardly directed force component tending to urge the ring 30 outwardly and hold it snugly in engagement with the tapered upper wall 39 and inner side 55 of the box member groove 32.

The angle $y$ that the surfaces of contact (designated by the line 56) between the upper tapered portion 36 of the lock member 30 and the opposed tapered wall 37 of the pin member groove make to the line 51 normal to the line of compressive force 50 is relatively small, so that the compressive force passing through the lock ring is transmitted through a large surface of contact between the lock ring surface 36 and the tapered side 37 of the pin member groove. As a result, the tilting action on the lock ring, referred to above in prior devices, is substantially entirely eliminated, while the outwardly directed force is still present to urge the lock ring 30 in an outward direction to hold it fully within the internal circumferential groove 32 of the box member.

The lock ring 30 is releasable from the box member groove 32 from a remote location and by a fluid operated device. As disclosed, a solid, cylinder ring 60 surrounds the box member 10, being suitably secured thereto, as by welding 61, at its upper and lower ends. This ring has a plurality of circumferentially spaced, radially arranged cylinder bores 62 aligned with companion bores 63 in the box member 10 and opening through the base 55 of the internal groove 32. A radial piston 64 is slidably mounted in each cylinder bore 62, with its inner piston rod or extension 65 of reduced diameter passing through the aligned bore 63 in the box member in a position to contact the periphery of the lock ring 30. Each piston 64 carries a suitable piston or seal ring 66 thereon slidably sealing against the wall of its cylinder or bore 62.

The solid ring 60 has a circumferentially continuous channel or groove 67 formed therein, the upper end of which opens into all of the cylindrical bores 62 on the low pressure side of the pistons 64 to establish intercommunication between all of the bores on such low pressure side. Similarly, the solid ring has a circumferentially continuous groove 68 cut at the head end portions of the cylinders, establishing communication with all of the cylinders or radial bores 62.

The outer ends of the cylinders 62 are closed by a circumferentially continuous cylinder head or ring 69 disposed around all of the cylinder bores, the inner surface 69a of such circumferentially continuous cylinder head engaging an upper seal ring 70 disposed completely around the solid ring 60 above the cylinder bores, and also with a lower seal ring 71 disposed around the solid ring 60 below all of the cylinder bores. The cylinder head 69 is secured to the solid cylinder ring 60 by a depending lip portion 72 received within a circumferential groove 73 in the solid ring, the solid ring having a circumferentially continuous lip portion 74 bearing against and encompassing the cylinder head lip portion 72. The cylinder head is also attached to the solid ring 60 by circumferentially spaced radial cap screws 75 extending through the cylinder head 69 and threaded within the solid ring 60 above the upper seal ring 70, the heads 76 of the screws preferably being disposed within recesses 77 in the cylinder head. When the screws 75 are tightened, the inner surface 69a of the cylinder head sealingly engages the upper and lower seal rings 70, 71 to prevent leakage from the head ends of the cylinders or radial bores 62.

The outer circumferentially continuous channel or fluid pressure groove 68 communicates with a port 80 opening into an inlet passage 81 extending through the solid ring, an inlet pipe or conduit 82 being connected to the solid ring 60 in communication with this passage and adapted to extend upwardly to the drilling platform or floating barge (not shown). The inner channel 67, which is actually an exhaust channel, communicates through an exhaust port 83 with an exhaust passage 84 formed in the solid ring, which, in turn, communicates with an exhaust pipe or conduit 85 extending upwardly through the body of water to the floating barge or drilling platform. Thus, the head ends of all of the cylinders 62 are in communication with the inlet pipe 82 through the high pressure channel 68, port 80, and inlet passage 81; whereas, the low pressure sides or inner rod ends of the cylinders all communicate with the exhaust pipe or conduit 85 through the inner circumferential channel 67, exhaust port 83, and exhaust passage 84.

As disclosed most clearly in FIG. 2, the cylinders 62 and pistons 64 are radially arranged and circumferentially spaced from one another, the piston rods 65 all engaging the periphery of the spring-like expansible lock ring 30. As assurance that the split or gap 89 of the lock ring will not become aligned with one of the piston rods 65, which might interfere with proper functioning of the apparatus, the lock ring 30 is properly oriented with respect to the pin member 11 by a pair of radial retention pins 90, each of which is disposed partially in a socket 91 extending upwardly from the upper outer portion of the pin member groove 31, each pin 90 being suitably secured to the pin member 11 by welding, brazing, or the like. Each pin member 90 extends downwardly into the groove 31 and is receivable within a recess 92 in the upper portion of the lock ring 30. The retention pins 90 will prevent any substantial turning of the lock ring 30 within its groove 31 and will locate the lock ring split or gap 89 in a predetermined position circumferentially of the pin member 11. The retention pins have an additional purpose, which is to prevent inadvertent improper or inverted installation of the lock ring 30 in the external groove 31. If an attempt were made to mount the lock ring in an inverted position in the lock ring groove, the retention pins 90 would engage the inner surface 41 of the lock rig and prevent movement of the lock ring into the groove 31.

The pin and box members 11, 10 are properly indexed with respect to each other to insure that the split or gap 89 lies between a pair of cylinders 62 and pistons 64 by an indexing pin or lug 95 suitably secured to the pin member 11 and receivable within a slot 96 in the box member 10 that opens downwardly through its lower end. This slot has downwardly diverging side walls 97 which engage the pin 95 and turn the box member 10 relative to the pin, the pin 95 being then received within the upper relatively narrow portion 98 of the slot 96 when the lock member 30 snaps into the internal groove 32 in the box member. Since the pin member 11 and box member 10 have been oriented or indexed with respect to one another, and since the lock ring 30 is circumferentially held in a predetermined position by the retention pins 90, the split or gap 89 will fall between a pair of radial cylinders 62 and the pistons 64 therewithin, as disclosed in FIG. 2.

The spring force in the lock ring 30 inherently causes it to expand outwardly and shift the pistons 64 outwardly in their cylinder bores 62, the parts being in the position illustrated in FIGS. 1, 2 and 3.

Figure 7:
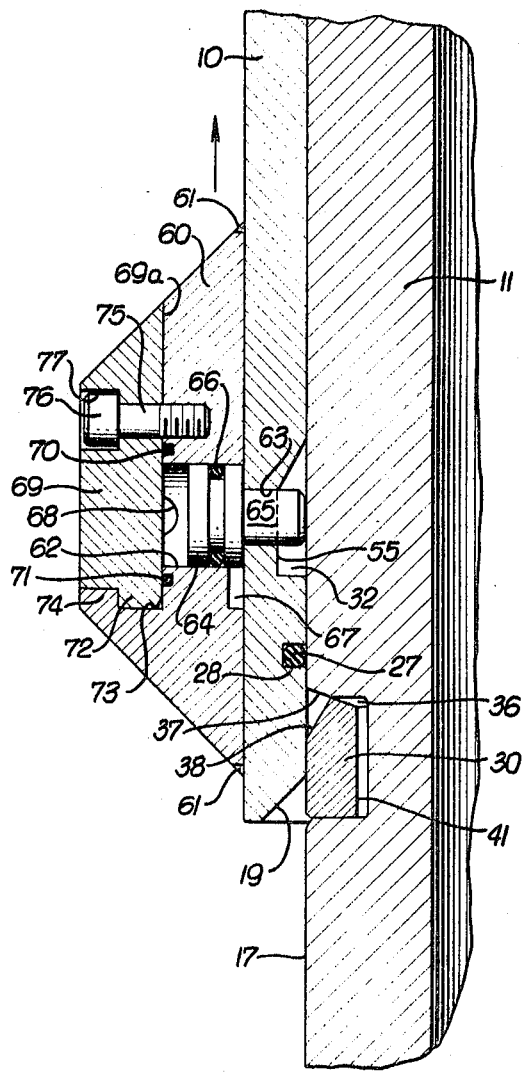
FIG. 7 is a view similar to FIGS. 3 and 4 illustrating the releasing of the pin and box members of the tool joint with respect to one another.

In stabbing the box member 10 over the pin member 11, the pistons 64 will not interfere with downward movement of the box member fully over the pin member, the spring-like lock ring 30, when expanding into the groove 32, shifting the pistons 64 fully outwardly. When it is desired to uncouple the box member 10 from the pin member 11, which, for example, will occur in the event the tool joint connection 10, 11 has been made at or near the mudline, all that need be done is to impose fluid pressure, such as hydraulic fluid pressure, through the inlet conduit 82, inlet passage 81, port 80, and channel 68 to the head ends of all of the cylinders 62, which will shift the pistons 64 inwardly and contract the lock ring 30 fully from the internal groove 32, the limit of movement of the pistons being determined by engagement of the piston heads with the exterior of the box member 10, as shown in FIG. 4, in which position the inner ends of the piston rods 65 do not lie inwardly of the internal diameter of the box member. The pipe A above the pin member 11 can now be elevated, which will cause the box member 10 and its pistons 64, 65 to slide upwardly along the pin member 11 and the lock ring 30, as shown in FIG. 7, until the box member has been elevated from the lock ring 30, continuing elevation of the box member removing it fully from the pin member.

During the inward shifting of the pistons 64 within their cylinders 62 in effecting retraction of the lock ring 30 from the internal groove 32, the fluid in the cylinders on the low pressure side of the piston heads can flow outwardly through the common channel 67, exhaust port 83 and exhaust passage 84 to the exhaust pipe or conduit 85, thereby precluding the existence of a hydraulic lock that would interfere with proper operation of the apparatus. It is necessary to allow the fluid to bleed from the low pressure sides of the cylinders 62, inasmuch as the primary and secondary seals 25, 27 prevent movement of fluid longitudinally between the pin and box members.

In the manner described above, release of the lock ring 30 from the internal groove 32 can be effected from a remote location, such as from a drilling platform or floating barge, merely by pumping fluid under pressure through the inlet conduit 82 and into the head ends of the cylinders 62. It is unnecessary to lower a diver to the joint location for the purpose of accomplishing the disconnection.

I claim:

1. In a tool joint: a box member; a pin member receivable in said box member; one of said members having laterally movable lock means thereon; said other of said members having lock receiving means thereon for receiving said lock means upon reception of said pin member in said box member to lock said members together against longitudinal movement with respect to each other; and fluid operated means on one of said members engageable with said lock means to shift said lock means from said lock receiving means to unlock said members from each other; wherein said lock means comprises an expandable and contractable split ring mounted in a circumferential groove in said pin member, said lock receiving means comprising a circumferential groove in said box member for receiving said ring to lock said members together, said fluid operated means comprising a cylinder ring fixed to and circumscribing said box member and having a plurality of circumferentially spaced, generally radial cylinder bores therein, said box member having companion bores opening into said box member groove, piston means in said cylinder bores extending through said companion bores into contact with said lock ring, a cylinder head encompassing said cylinder ring to close the head ends of said cylinder bores, and means for feeding fluid under pressure simultaneously to the head ends of said cylinder bores to contract said lock ring from said box member groove.

2. In a tool joint as defined in claim 1; wherein said feeding means comprises a circumferentially continuous inlet channel in one of said cylinder ring and cylinder head communicating with the head ends of said cylinder bores, and means for providing an inlet passage to said channel.

3. In a tool joint as defined in claim 1; and means for allowing escape of fluid simultaneously from the regions of said cylinder bores adjacent to said companion bores.

4. In a tool joint as defined in claim 1; wherein said feeding means comprises a circumferentially continuous inlet channel in one of said cylinder ring and cylinder head communicating with the head ends of said cylinder bores, means providing an inlet passage to said channel; a circumferentially continuous exhaust channel in one of said cylinder ring and cylinder head communicating with the regions of said cylinder bores adjacent to said companion bores to allow escape of fluid from said regions, and means providing an outlet passage from said exhaust channel.

5. In a tool joint as defined in claim 1; and means for orienting said ring circumferentially with respect to said pin and box members to retain the split of said ring out of alignment with said piston means.

6. In a tool joint as defined in claim 1; means for orienting said ring circumferentially with respect to said pin and box members to retain the split of said ring out of alignment with said piston means; said orienting means comprising a slot in said box member receiving a pin on said pin member, and a pin on said pin member received within a recess in said lock ring.

7. In a tool joint: a box member; a pin member receivable in said box member; one of said members having laterally movable lock means thereon; said other of said members having lock receiving means thereon for receiving said lock means upon reception of said pin member in said box member to lock said members together against longitudinal movement with respect to each other; and fluid operated means on one of said members engageable with said lock means to shift said lock means from said lock receiving means to unlock said members from each other; wherein said lock means comprises an expandable and contactable split ring mounted in a circumferential groove in said pin member, the minimum axial width of said groove in said pin member being at least equal to the maximum axial width of said split ring, said lock receiving means comprising a circumferential groove in said box member for receiving said ring to lock said members together, said fluid operated means comprising a plurality of circumferentially spaced, generally radial cylinder and piston devices on said box member engaging said ring to contract said ring from said box member groove to unlock said members from each other;

and means for orienting said ring circumferentially with respect to said pin and box members to retain the split of said ring out of alignment with said cylinder and piston devices.

References Cited

UNITED STATES PATENTS

| | | | |
|---|---|---|---|
| 2,104,180 | 1/1938 | Barker | 285—141 |
| 2,877,732 | 3/1959 | Eaton | 285—321 X |
| 3,137,348 | 6/1964 | Ahlstone et al. | 166—0.6 |
| 3,155,401 | 11/1964 | Musolf | 285—18 |
| 3,252,718 | 5/1966 | Yancey | 285—321 X |
| 3,297,344 | 1/1967 | Hanes | 285—321 X |
| 3,326,285 | 6/1967 | Coberly | 166—0.6 |
| 3,338,596 | 8/1967 | Knox | 285—321 X |

FOREIGN PATENTS

| | | |
|---|---|---|
| 527,928 | 4/1954 | Belgium. |
| 932,002 | 7/1963 | Great Britain. |

CARL W. TOMLIN, Primary Examiner

D. W. AROLA, Assistant Examiner

U.S. Cl. X.R.

285—141, 308, 321